(12) United States Patent
Nakata et al.

(10) Patent No.: US 10,654,288 B2
(45) Date of Patent: May 19, 2020

(54) INK JET RECORDING METHOD AND INK JET RECORDING APPARATUS

(71) Applicant: CANON KABUSHIKI KAISHA, Tokyo (JP)

(72) Inventors: Eiichi Nakata, Kawasaki (JP); Minako Kawabe, Koganei (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/138,432

(22) Filed: Sep. 21, 2018

(65) Prior Publication Data

US 2019/0111711 A1    Apr. 18, 2019

(30) Foreign Application Priority Data

Oct. 17, 2017 (JP) ................................ 2017-200732
Aug. 24, 2018 (JP) ................................ 2018-157320

(51) Int. Cl.
| | | |
|---|---|---|
| *B41J 11/00* | (2006.01) | |
| *B41M 5/00* | (2006.01) | |
| *C09D 11/30* | (2014.01) | |
| *B41J 13/10* | (2006.01) | |
| *C09D 11/102* | (2014.01) | |

(Continued)

(52) U.S. Cl.
CPC ........ *B41J 11/0015* (2013.01); *B41J 11/0005* (2013.01); *B41J 13/106* (2013.01); *B41M 5/0023* (2013.01); *C09D 11/102* (2013.01); *C09D 11/106* (2013.01); *C09D 11/107* (2013.01); *C09D 11/30* (2013.01)

(58) Field of Classification Search
CPC . B41J 11/0015; B41M 5/0023; C09D 11/102; C09D 11/324; C09D 11/326

USPC ........................................... 347/95, 100–102
See application file for complete search history.

(56) References Cited

U.S. PATENT DOCUMENTS

| | | | |
|---|---|---|---|
| 7,297,194 | B2 | 11/2007 | Shinjo et al. |
| 7,950,793 | B2 | 5/2011 | Aruga et al. |
| 9,187,662 | B2 | 11/2015 | Yamamoto et al. |

(Continued)

FOREIGN PATENT DOCUMENTS

| | | |
|---|---|---|
| JP | 2005-298813 A | 10/2005 |
| JP | 2005-320509 A | 11/2005 |

OTHER PUBLICATIONS

Mar. 20, 2019 extended European Search Report in European Patent Appln. No. 18197901.4.

*Primary Examiner* — An H Do
(74) *Attorney, Agent, or Firm* — Venable LLP (57) ABSTRACT

To provide an ink jet recording method using facedown discharge and capable of obtaining a recorded matter being suppressed a generation of minus curl. The method provided is an ink jet recording method including a step of recording an image on a recording medium having a first surface and a second surface by ejecting an aqueous ink from a recording head. This method further includes, after the recording step, a step of discharging the recording medium while placing the first surface or the second surface on which the image has been recorded last on a gravitationally lower side. In this method, the aqueous ink has a viscosity $\eta_1$ of 5.0 mPa·s or more and a difference $\eta_2-\eta_1$ between a viscosity $\eta_2$ of an evaporated ink obtained by evaporating 20% by mass of the aqueous ink and the viscosity $\eta_1$ of the aqueous ink is 4.0 mPa·s or more.

16 Claims, 3 Drawing Sheets

(51) Int. Cl.
*C09D 11/106* (2014.01)
*C09D 11/107* (2014.01)

(56) References Cited

U.S. PATENT DOCUMENTS

| | | |
|---|---|---|
| 2009/0102908 A1 | 4/2009 | Imoto |
| 2013/0257957 A1 | 10/2013 | Itogawa |
| 2014/0292974 A1 | 10/2014 | Kodama et al. |
| 2018/0134907 A1 | 5/2018 | Saito et al. |
| 2018/0291217 A1* | 10/2018 | Kagata .................. B41J 2/1652 |

* cited by examiner

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

In recent years, frequency of the use of ink jet recording apparatuses in offices has been increasing and ink jet recording apparatuses have been required to have a higher recording speed. Improvement in recording speed is sometimes achieved not by a method of recording an image through multi-pass recording with a conventional serial type recording head (serial head) but by a method of recording an image through single-pass recording with a line type recording head (line head).

Among recording apparatuses used in offices, an electrophotographic type recording apparatus usually adopts facedown discharge, that is, discharge of a recording medium (recorded matter) having thereon a recorded image with the back surface up. For example, when texts over two pages are recorded on the one side of two recording mediums, respectively, by facedown discharge, the first recorded page is discharged with the recorded surface down and then, the second recording page is discharged on the first page. By reversing a bundle of the recorded matters without changing their discharge state, a bundle of the recorded matters stacked in order of page number can be obtained. When so-called "faceup discharge" in which recorded matters are discharged with the surface up is adopted, on the other hand, a bundle of recorded matters thus obtained has page numbers in reverse order. Recording apparatuses for office use often required to simultaneously produce a large number of recorded matters therefore tend to adopt facedown discharge from the standpoint of usability.

When an image is recorded on a recording medium such as plain paper having no coating layer by using a conventional ink jet recording apparatus, concave deformation of the recording medium with the ink-applied surface inside, that is, so-called curl (plus curl) occurs easily during a period from several hours to several days after recording. To prevent such curl, an ink containing a specified water-soluble organic compound is proposed (Japanese Patent Application Laid-Open No. 2005-298813). Another proposal is to use an ink having a viscosity as high as 5 mPa·s or more for an ink jet recording method and it includes a description of the use of faceup discharge for recording of an image (Japanese Patent Application Laid-Open No. 2005-320509).

SUMMARY OF THE INVENTION

The conventional ink jet recording apparatuses have adopted not facedown discharge but faceup discharge because of the following two reasons. First, these inkjet recording apparatuses are used mainly for discharge of recorded matters (such as postal matters including New Year's cards and photographs) not requiring consideration of a recording order or recorded matters with a small number of pages which can be rearranged easily. For an ink jet recording method using an aqueous ink, faceup discharge in which paper is discharged with the recorded surface just before drying up is advantageous because the ink can be dried speedily. As described above, on the other hand, the facedown discharge is advantageous because a bundle of recorded matters stacked in order of page number can be obtained.

Even when an ink jet recording method is used, adoption of facedown discharge is investigated for recording apparatuses for offices based on the assumption of simultaneous recording of a large number of recorded matters. In addition, use of facedown discharge mechanism enables layout of a recording unit or discharge unit above a storage unit of recording media. This is also advantageous for reduction in the installation area of the apparatus.

The present inventors have carried out various investigations by using an ink having the composition proposed in Japanese Patent Application Laid-Open No. 2005-298813 for an ink jet recording apparatus equipped with a facedown discharge mechanism. As a result, it has been found that different from the above-described plus curl, curl deformation (minus curl) of a recording medium with the ink-applied surface outside occurs easily immediately after recording. Further, it has been found that minus curl may also occur even when an ink having the composition proposed in Japanese Patent Application Laid-Open No. 2005-320509 is used.

An object of the invention is therefore to provide an ink jet recording method using facedown discharge which enables obtaining a recorded matter which is suppressed a generation of minus curl. Another object of the invention is to provide an ink jet recording apparatus to be used for this ink jet recording method.

An ink jet recording method according to the invention has a step of recording an image on a recording medium having a first surface and a second surface by ejecting an aqueous ink from a recording head and it further has, after the recording step, a step of discharging the recording medium while placing the first surface or second surface on which the image has been recorded last on a gravitationally lower side. In this method, the aqueous ink has a viscosity $\eta_1$ (mPa·s) of 5.0 mPa·s or more and a difference $\eta_2-\eta_1$ between a viscosity $\eta_2$ (mPa·s) of an evaporated ink obtained by evaporating 20% by mass of the aqueous ink and the viscosity $\eta_1$ (mPa·s) of the aqueous ink is 4.0 mPa·s or more.

The invention makes it possible to provide an ink jet recording method using facedown discharge which enables obtaining a recorded matter which is suppressed a generation of minus curl. In addition, the invention makes it possible to provide an ink jet recording apparatus to be used for this ink jet recording method.

Further features of the present invention will become apparent from the following description of exemplary embodiments with reference to the attached drawings.

DESCRIPTION OF THE EMBODIMENTS

The invention will hereinafter be described in further detail by preferred embodiments. In the invention, when an ink contains a compound and the compound is a salt, the salt dissociates into ions in the ink, which is however expressed as "the ink contains a salt" for the convenience sake. An aqueous ink for ink jet is sometimes called "ink" simply. The physical property value is a value at normal temperature (25° C.) under normal pressure (1 atomic pressure) unless otherwise particularly specified.

As described above, the present inventors made an investigation on the use of an ink having the composition proposed in Japanese Patent Application Laid-Open No. 2005-298813 for an ink jet recording apparatus equipped with a facedown discharge mechanism. As a result, it has been revealed that minus curl occurs immediately after recording. It has also been revealed that minus curl occurs more frequently when high speed recording is performed using an ink jet recording apparatus equipped with both a facedown discharge mechanism and a line head. As the average speed (linear speed) of a recording medium passing through a position of a conveyance route of the recording medium opposite to a recording head becomes larger, the more markedly minus curl occurs. Once minus curl occurs during continuous recording, two recorded matters ejected successively to a discharge tray interfere with each other. This causes sheet-jam of the recorded matters and prevents stacking of them in order.

The cause of minus curl is presumed to be different from that of plus curl. First, a difference will be described between minus curl which occurs when an ink jet recording apparatus equipped with a facedown discharge mechanism is used and plus curl conventionally regarded as a problem.

When an ink is applied to a recording medium, the hydrogen bond between celluloses constituting the recording medium is broken by a liquid component (water or water-soluble organic solvent) in the ink and at the same time, the celluloses are swollen with it. As a result, minus curl of the recording medium, that is, convex deformation (concave when the discharge state is observed) with the ink-applied surface outside occurs. This minus curl occurs immediately after recording and it stops in several tens of seconds.

On the other hand, plus curl occurs as follows. When an ink is applied to a recording medium, celluloses constituting the recording medium swell with the ink. Usually, water starts evaporation prior to a water-soluble organic solvent because water has a higher vapor pressure than another liquid component in the aqueous ink. Since water that has swelled celluloses evaporates, a hydrogen bond once broken is formed again between celluloses, leading to shrinkage of them. This causes plus curl of the recording medium, that is, concave deformation with the ink-applied surface inside. This means that plus curl proceeds slowly for several days, starting from several hours after recording because it occurs due to evaporation of water and shrinkage of celluloses.

It can be considered from the above description that force to cause minus curl also works even when a conventional ink jet recording apparatus equipped with a faceup discharge mechanism is used. In the ink jet recording apparatus equipped with a faceup discharge mechanism, however, a recording medium is discharged with a recorded surface up so that the own weight of the recording medium surpasses the convex deformation force with an ink-applied surface outside. Minus curl therefore scarcely occurs. In the ink jet recording apparatus equipped with a facedown discharge mechanism, on the other hand, force to swell the recording medium serves as force to cause minus curl as is so that minus curl occurs markedly. When a linear speed is small, it usually takes from several seconds to several tens of seconds to complete the discharge of the recording medium immediately after application of an ink to the recording medium. The recording medium swells as soon as an ink is applied, but minus curl scarcely occurs at the time of discharge because the recording medium is nipped, at both end portions thereof, with a roller or the like.

The present inventors have made various investigations with a view to suppressing minus curl which tends to occur particularly when an ink jet recording apparatus equipped with a facedown discharge mechanism is used. Minus curl is caused by swelling of celluloses with a liquid component in the ink which has permeated between celluloses whose hydrogen bond has been broken by a hydroxy group of the liquid component. The present inventors have therefore verified whether or not a difference in swelling ratio of a recording medium such as plain paper having no coating layer appeared, depending on the kind of a water-soluble organic solvent. More specifically, they add a predetermined amount of water or a water-soluble organic solvent ordinarily used for an ink jet aqueous ink and measure the swelling ratio of the recording medium. As a result, they have found that the swelling ratio is highest when water is used and there appears a difference in swelling ratio, depending on the kind of a water-soluble organic solvent. In addition, they have verified the relationship between various physical properties of a water-soluble organic solvent and the swelling ratio of a recording medium. As a result, they have found that the swelling ratio of a recording medium tends to become smaller when a water-soluble organic solvent having a higher evaporation viscosity is used. They have confirmed that compared with an ink using a water-soluble organic solvent with which the recording medium swells at a large swelling ratio, an ink using a water-soluble organic solvent with which a recording medium swells at a small swelling ratio can suppress minus curl when an ink jet recording apparatus equipped with a facedown discharge mechanism is used.

As described above, among liquid components used for an aqueous ink, water swells a recording medium at a highest swelling ratio. It is therefore important to prevent water from permeating through celluloses constituting a recording medium in order to suppress minus curl. A water-soluble organic solvent present with water permeates through a recording medium more slowly than water because its viscosity tends to increase more easily than water when evaporated. On the other hand, water starts permeation through the recording medium and also starts evaporation as soon as an ink is applied. Since permeation of the water-soluble organic solvent through the recording medium becomes slow, evaporation of water proceeds. An amount of water permeating through the recording medium therefore decreases and this is presumed to lead to a decrease in the swelling ratio of the recording medium.

The present inventors have investigated how much the liquid component in an ink decreases during several tens of seconds from application of an ink to a recording medium to cause minus curl to termination of the progress of minus curl. More specifically, they have investigated by using various recording media (plain paper) at 25° C. and a relative humidity of 50% which are conditions supposed based on typical indoor environment. As a result, they have confirmed that the progress of minus curl becomes steady about 60 seconds after application of an ink to a recording medium. Further, an amount of a liquid component evaporated during 60 seconds after application of an ink to a recording medium is estimated by measuring the weight of a recorded matter periodically for this period. This has revealed that the liquid component corresponding to about 20% by mass of the ink applied to the recording medium evaporates. These results suggest that by considering the amount of a liquid component evaporated during occurrence and progress of minus curl, occurrence and progress of minus curl can be grasped correctly.

For these reasons, minus curl which easily occurs when an ink jet recording apparatus equipped with a facedown discharge mechanism is used for recording can be suppressed by increasing the viscosity of an ink from which a liquid component has been evaporated. The present inventors have therefore made a further investigation on the relationship between the viscosity of an ink from which a predetermined amount of a liquid component has been evaporated (this ink may hereinafter is called "evaporated ink") and an occurrence degree of minus curl. As a result, they have found that by satisfying the following requirements (i) and (ii), minus curl can be suppressed even when facedown discharge is adopted.

(i) An ink has a viscosity $\eta_1$ (mPa·s) of 5.0 mPa·s or more.
(ii) A difference $\eta_2-\eta_1$ between a viscosity $\eta_2$ (mPa·s) of an evaporated ink obtained by evaporating 20% by mass of an ink and the viscosity $\eta_1$ (mPa·s) of the ink is 4.0 mPa·s or more.

When the ink has a viscosity $\eta_1$ of less than 5.0 mPa·s, minus curl cannot be suppressed even if the viscosity of an evaporated ink is increased. Even when the ink has a viscosity $\eta_1$ of 5.0 mPa·s or more, minus curl cannot be suppressed when the difference $\eta_2-\eta_1$ between the viscosity $\eta_2$ (mPa·s) of an evaporated ink and the viscosity $\eta_1$ (mPa·s) of the ink is less than 4.0 mPa·s.

With a view to preventing an influence on the ejection property, conventional aqueous inks for general use are often designed so as not to have an increased viscosity even after a certain degree of the liquid component evaporates. In this case, the difference $\eta_2-\eta_1$ is about 3.0 mPa·s at most. This means that the ink to be used in the ink jet recording method of the invention is an aqueous ink that thickens particularly easily by evaporation.

It has been revealed that with an increase in the difference $\eta_2-\eta_1$ (viscosity difference $\eta_2-\eta_1$) between the viscosity $\eta_2$ (mPa·s) of an evaporated ink and the viscosity $\eta_1$ (mPa·s) of the ink, the surface, opposite to a recorded surface, of a recorded matter stacked on a discharge tray is stained more easily during continuous recording. A first recording medium placed on a discharge tray by facedown discharge has, on the back surface (upper surface) thereof, no image or has an image already formed for a predetermined time by the first recording of duplex recording. The recorded surface (bottom surface) of a second recording medium is therefore discharged while rubbing against the back surface (upper surface) side of the first recording medium on the discharge tray. When the viscosity difference $\eta_2-\eta_1$ is too large, the ink applied to the second recording medium inevitably comes into contact with the back surface of the first recording medium without sufficient permeation through the recording medium. It has been revealed that this may therefore lead to "smear", that is, a phenomenon in which a portion of the ink applied to the second recording medium stains the first recording medium.

Smear is likely to occur when an ink has a viscosity $\eta_1$ of 5.0 mPa·s or more and at the same time, has a viscosity difference $\eta_2-\eta_1$ of more than 10.0 mPa·s. Even when an ink has a viscosity difference $\eta_2-\eta_1$ of 10.0 mPa·s or less, smear is likely to occur when the ink has a viscosity $\eta_1$ of more than 10.0 mPa·s. This means that in the ink jet recording method of the invention using facedown discharge, an ink having a viscosity $\eta_1$ of 10.0 mPa·s or less and at the same time, having a viscosity difference $\eta_2-\eta_1$ of 10.0 mPa·s or less is preferred because it can reduce generation of smear.

<Ink Jet Recording Method and Ink Jet Recording Apparatus>

The ink jet recording method of the invention (which may hereinafter be called "recording method", simply) has a recording step, that is, a step of recording an image on a recording medium having a first surface and a second surface by ejecting an aqueous ink from a recording head. The recording method of the invention further has, after the recording step, a step of discharging the recording medium while placing the first surface or the second surface on which the image has been recorded last on the gravitationally lower side. In this method, the aqueous ink has a viscosity $\eta_1$ (mPa·s) of 5.0 mPa·s or more and at the same time, a viscosity difference $\eta_2-\eta_1$ between a viscosity $\eta_2$ (mPa·s) of an evaporated ink obtained by evaporating 20% by mass of the aqueous ink and the viscosity (mPa·s) of the aqueous ink is 4.0 mPa·s or more.

The ink jet recording apparatus of the invention (which may hereinafter be called "recording apparatus", simply) is used for recording an image on a recording medium having a first surface and a second surface by ejecting an aqueous ink from a recording head. The recording apparatus of the invention is equipped with a facedown discharge mechanism for discharging the recording medium while placing the first surface or the second surface on which the image has been recorded last on the gravitationally lower side. In this method, the aqueous ink has a viscosity $\eta_1$ (mPa·s) of 5.0 mPa·s or more and at the same time, a viscosity difference $\eta_2-\eta_1$ between a viscosity $\eta_2$ (mPa·s) of an evaporated ink obtained by evaporating 20% by mass of the aqueous ink and the viscosity $\eta_1$ (mPa·s) of the aqueous ink is 4.0 mPa·s or more.

The details of the ink jet recording apparatus and the ink jet recording method according to the invention will next be described referring to some drawings.

Figure 1:
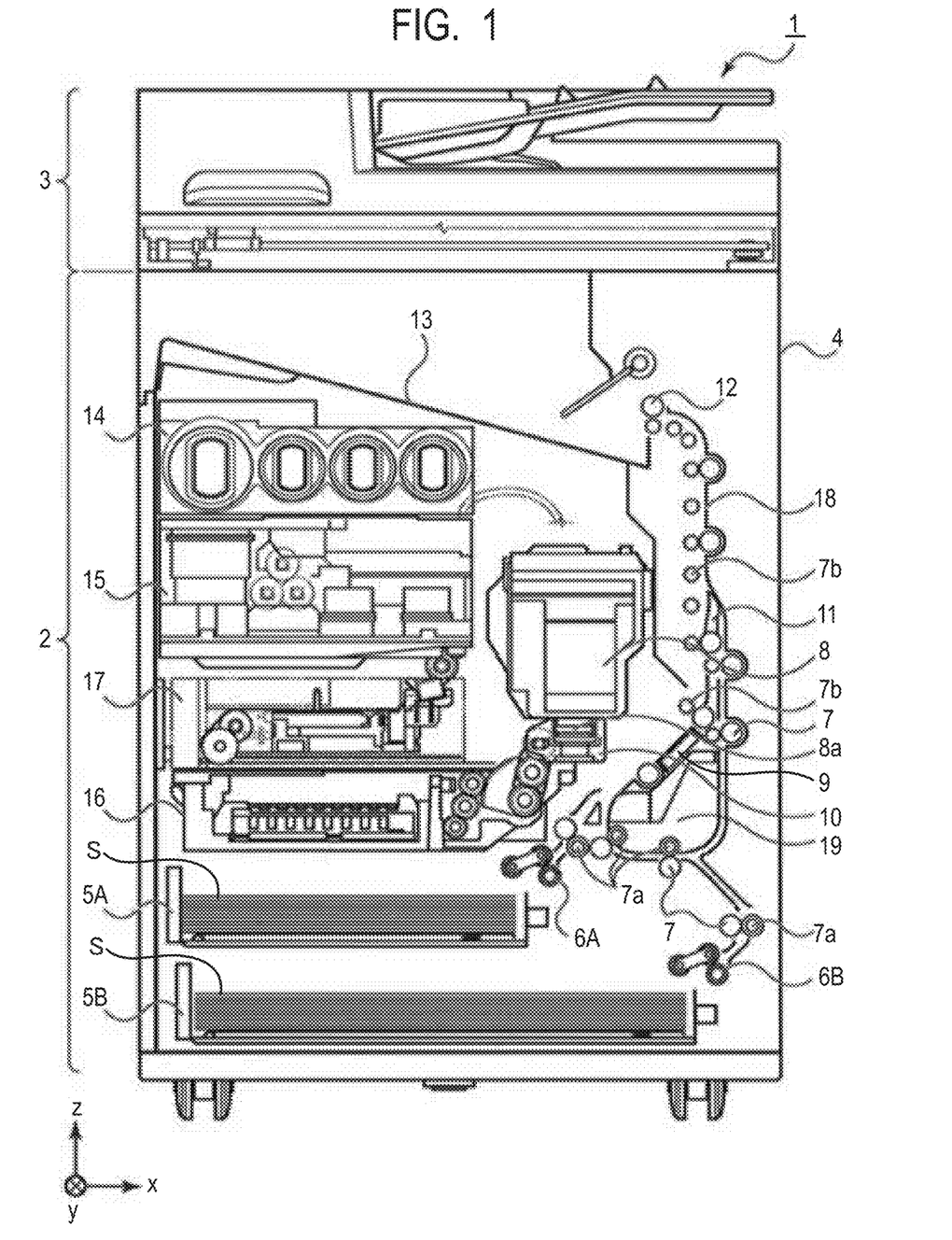
FIG. 1 is a cross-sectional view showing one embodiment of the ink jet recording apparatus of the invention.

FIG. 1 is a cross-sectional view showing one embodiment of the ink jet recording apparatus of the invention. In FIG. 1, x represents a horizontal direction, y represents an arrangement direction (depth direction) of ejection orifices of a recording head 8 and z represents a vertical direction. An ink jet recording apparatus 1 of the embodiment shown in FIG. 1 performs neither recording operation nor reading operation and is in a so-called standby state.

The ink jet recording apparatus 1 shown in FIG. 1 is a multifunctional machine equipped with a recording unit 2 and a scanner unit 3. The recoding unit 2 and the scanner unit 3, independently or in conjunction, perform various processings relating to a recording operation and a reading operation. The scanner unit 3 performs reading (scanning) of a manuscript. The ink jet recording apparatus of the invention does not necessarily have a scanner unit.

In the recording unit 2, a first cassette 5A and a second cassette 5B for housing a cut-sheet-shaped recording media S are detachably placed at the vertically lower bottom of a chassis 4. The first cassette 5A has therein flatly-stacked relatively small recording media having a size up to A4 size. The second cassette 5B has therein flatly-stacked relatively large recording media having a size up to A3 size. The first cassette 5A has, in the vicinity thereof, a first feed unit 6A for feeding the recording media S housed in the cassette while separating them from each other. Similarly, the second cassette 5B has, in the vicinity thereof, a second feed unit 6B. During the recording operation, the recording media S are fed selectively from either one of these cassettes.

A conveyance roller 7, a discharge roller 12, a pinch roller 7a, a spur 7b, a guide 18, an inner guide 19 and a flapper 11 constitute a conveyance mechanism for introducing the recording media S to a predetermined direction. The conveyance roller 7 is a drive roller placed on the upstream side and the downstream side of the recording head 8 and is driven by an unillustrated conveyance motor. The pinch roller 7a is a driven roller that nips and turns the recording media S along with the conveyance roller 7. The discharge roller 12 is a drive roller arranged on the downstream side of the conveyance roller 7 and is driven by an unillustrated conveyance motor. The spur 7b sandwiches and conveys the recording media S along with the conveyance roller 7 and the discharge roller 12 placed on the downstream side of the recording head 8.

The guide 18 is provided in a conveyance route of the recording media S and guides the recording media S to a predetermined direction. The inner guide 19 is a member extending in the direction y, has a curved side surface and guides the recording media S along the side surface. The flapper 11 is a member for changing the conveyance direction of the recording media S during a duplex recording operation. The discharge tray 13 is a tray for stacking and retaining the recording media S discharged by the discharge roller 12 after completion of the recording operation.

The recording head 8 is a full-line type recording head and a plurality of ejection orifices for ejecting an ink according to recording data is arranged along the y direction within a range covering the width of the recording media S. When the recording head 8 is at a standby position, an ejection orifice surface 8a of the recording head 8 is capped with a cap unit 10 as shown in FIG. 1. During the recording operation, the direction of the recording head 8 is changed so that the ejection orifice surface 8a faces to a platen 9. The platen 9 is comprised of a flat plate extending in the direction y and it supports the recording media S from its back surface during the recording operation by the recording head 8.

An ink tank unit 14 houses therein four inks to be supplied to the recording head 8. An ink supply unit 15 is provided midway of the flow path that connects the ink tank unit 14 and the recording head 8 and it adjusts the flow rate of the ink to the recording head 8 to fall within an adequate range. A maintenance unit 16 is equipped with the cap unit 10 and a wiping unit 17. It activates them at predetermined timing to perform a maintenance operation of the recording head 8.

When the ink jet recording apparatus shown in FIG. 1 is used, first, the recording media S housed in the first cassette 5A or the second cassette 5B are conveyed in the apparatus and an image is recorded on them by the recording head 8 of the recording unit 2. The recording media S on which the image has been recorded are discharged to the discharge tray 13 while placing the surface, on which the image has been recorded last (recorded just before discharge), on the gravitationally lower side, in other words, with the recorded surface down.

Figure 2A:
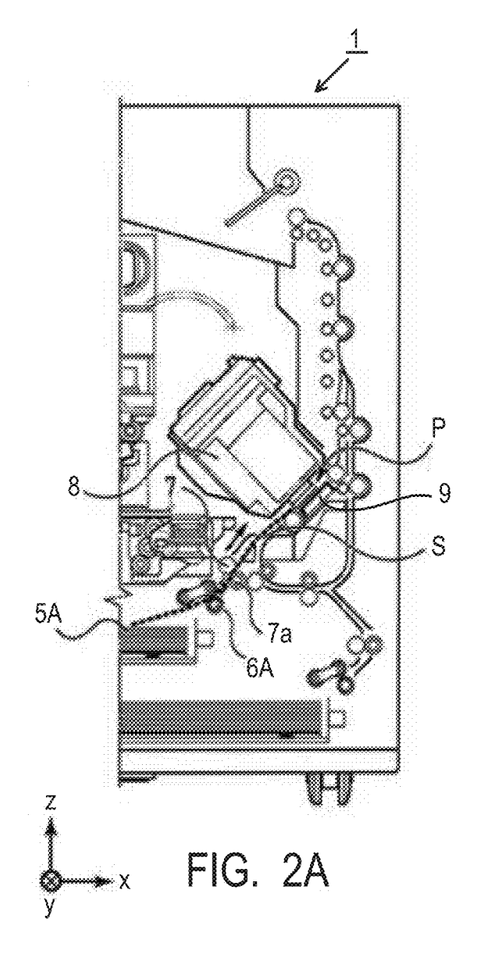
FIGS. 2A, 2B and 2C are cross-sectional views for describing the conveyance route of the recording medium during facedown discharge.
Figure 2B:
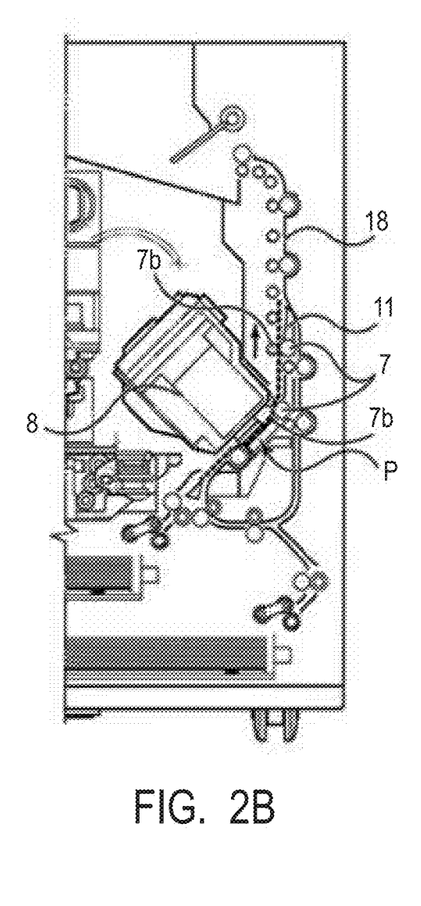
Figure 2C:
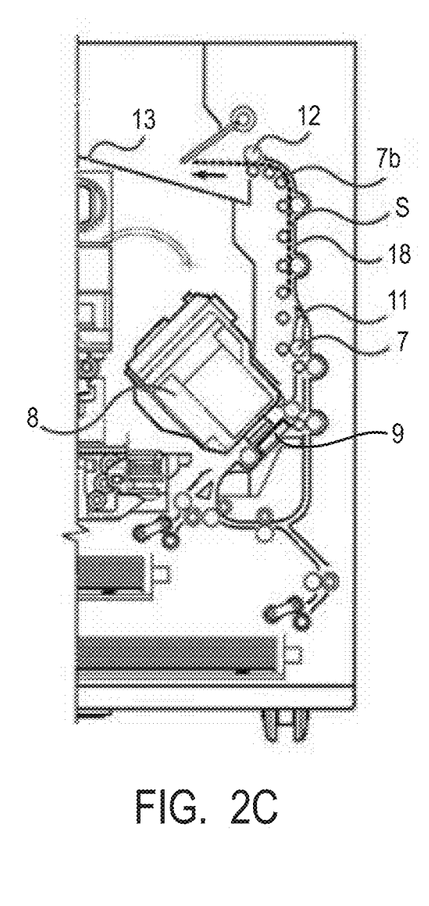

FIGS. 2A to 2C are cross-sectional views for describing the conveyance route of the recording media during facedown discharge. The recording medium S stacked top in the first cassette 5A is separated from the second and following recording media by the first feed unit 6A. It is conveyed to a recording region P between the platen 9 and the recording head 8 while being nipped by the conveyance roller 7 and the pinch roller 7a. FIG. 2A shows the end of the recording media S immediately before it reaches the recording region P. The traveling direction of the recording medium S is changed from a horizontal direction (x direction) to a direction tilted by about 45 degrees from the horizontal direction while it is fed by the first feed unit 6A and reaches the recording region P.

In the recording region P, an ink is ejected toward the recording media S from a plurality of ejection orifices provided in the recording head 8. Examples of an ink ejection method include a thermal ink ejection method making use of an ejection element that generates thermal energy and generating air bubbles and a so-called piezo ink ejection method that applies dynamic energy to an ink. In the invention, use of a line head that ejects an ink by a thermal method is particularly preferred. The recording medium S in an ink-applied region is supported at its back surface by the platen 9. A distance between the ejection orifice surface and the recording medium S is therefore kept constant. The ink-applied recording medium S passes on the left side of the flapper 11 having an end tilted to the right and conveyed to a vertically upward direction of the ink jet recording apparatus 1 along the guide 18 while being guided by the conveyance roller 7 and the spur 7b. FIG. 2B shows the end of the recording media S passing through the recording region P and being conveyed in the vertically upward direction. The traveling direction of the recording medium S is changed by the conveyance roller 7 and the spur 7b from the position of the recording region P tilted by about 45 degrees from the horizontal direction to the vertically upward direction.

The recording medium S is discharged to the discharge tray 13 by means of the discharge roller 12 and the spur 7b after conveyed in the vertically upward direction. FIG. 2C shows the facedown discharge of the recording medium S to the discharge tray 13 after the end of it passes through the discharge roller 12. The recording medium S thus discharged is retained on the discharge tray 13 with the surface, on which an image has been recorded by the recording head 8, down.

FIGS. 3A to 3D are cross-sectional views for describing the conveyance route of the recording medium when faceup discharge is performed. In faceup discharge, after an image is recorded in a manner similar to that described referring to FIGS. 2A to 2C, the recording medium is reversed in the apparatus and then discharged. The conveyance step during recording of an image is similar to that described referring to FIGS. 2A to 2C so that it is not described here. The conveyance step after FIG. 2C will hereinafter be described referring to FIGS. 3A to 3D.

Figure 3A:
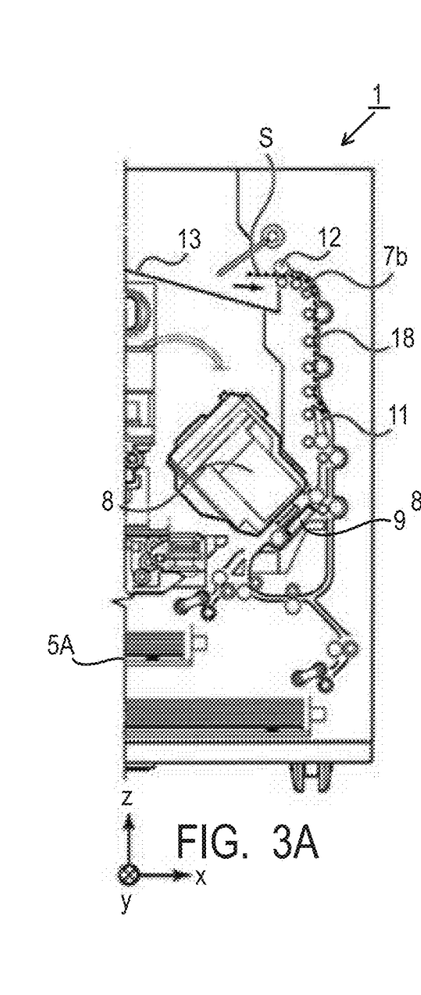
FIGS. 3A, 3B, 3C and 3D are cross-sectional views for describing the conveyance route of the recording medium during faceup discharge.

When the recording operation by the recording head 8 is completed and the rear end of the recording medium S passes the flapper 11, the conveyance roller 7 is rotated in a counter direction to convey the recording medium S to the inside of the ink jet recording apparatus 1. The flapper 11 is controlled to lean its end to the left side by an unillustrated actuator so that the end (rear end in the recording operation of the first surface) of the recording medium S passes on the right side of the flapper 11 and is conveyed in the vertically downward direction. FIG. 3A shows the end (rear end in the recording operation of the first surface) of the recording medium S passing on the right side of the flapper 11. Then, the recording medium S is conveyed along the curved outer peripheral surface of the inner guide 19 to between the recording head 8 and the platen 9 again.

Figure 3B:
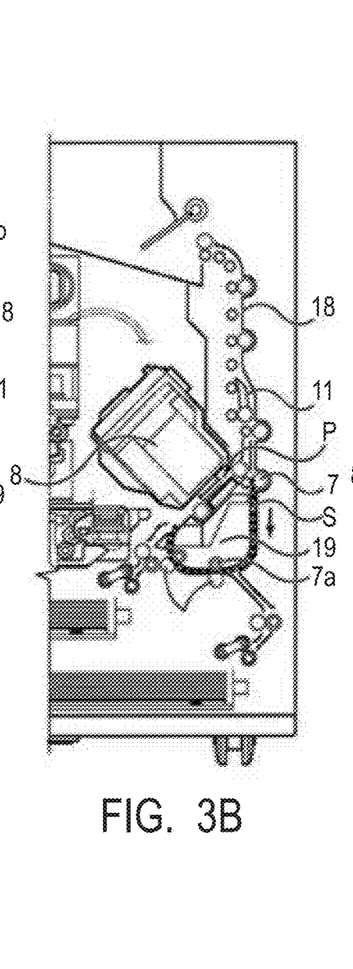
Figure 3C:
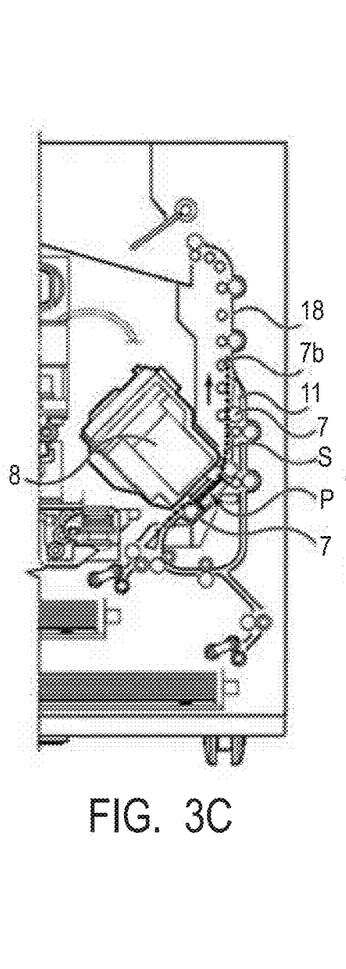
Figure 3D:
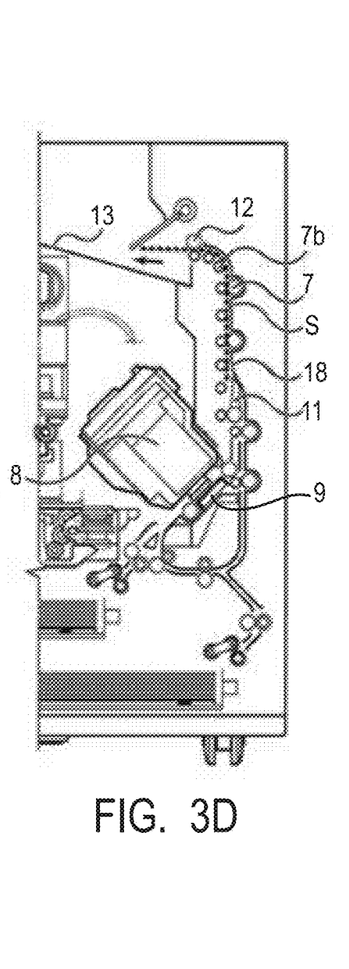

The conveyance route thereafter is similar to that in the case of recording an image on the first surface as shown in FIGS. 2B and 2C. FIG. 3C shows the conveyance of the recording medium S in the vertically upward direction after the end of it passes through the recording region P. At this time, the flapper 11 is controlled by an unillustrated actuator so that its end moves to a position leaning to the right side. FIG. 3D shows faceup discharge of the recording medium S to the discharge tray 13 after the end of it passes the discharge roller 12.

By using the ink jet recording apparatus 1 of the present embodiment, so-called duplex printing, that is, recording of an image on both the first surface and the second surface (both surfaces) of the recording medium, that is, can be performed. In the case of FIGS. 3A to 3D, recording of an image on the first surface (surface) is followed by recording of an image on the second surface (back surface). The conveyance step in recording of an image on the first surface is similar to that shown in FIGS. 2A to 2C so that a description on it is omitted. The conveyance step after FIG. 2C will hereinafter be described referring to FIGS. 3A to 3D.

After the recording operation of the recording head 8 on the first surface is completed and the rear end of the recording medium S passes the flapper 11, the conveyance roller 7 is rotated in a counter direction and the recording medium S is conveyed to the inside of the ink jet recording apparatus 1. At this time, the flapper 11 is controlled by an unillustrated actuator so that its end leans to the left side so that the end (rear end in the recording operation of the first surface) of the recording medium S passes on the right side of the flapper 11 and is conveyed in the vertically downward direction. FIG. 3A shows the passage of the end (rear end in the recording operation of the first surface) of the recording medium S on the right side of the flapper 11. Then, the recording medium S is conveyed along the curved outer peripheral surface of the inner guide 19 and is conveyed again to the recording region P between the recording head 8 and the platen 9. At this time, the second surface of the recording medium S faces to the ejection orifice surface 8a of the recording head 8. FIG. 3B shows the conveyance just before the end of the recording medium S reaches the recording region P for the recording operation on the second surface.

The conveyance route thereafter is similar to that in the case where an image is recorded on the first surface as shown in FIGS. 2B and 2C. FIG. 3C shows the conveyance of the recording medium S in the vertically upward direction after the end of it passes through the recording region P. At this time, the flapper 11 is controlled by an unillustrated actuator so that its end moves to a positon leaning to the right side. FIG. 3D shows discharge of the recording medium S to the discharge tray 13 after the end of it passes the discharge roller 12.

As the recording medium, it is preferred to use a recording medium having no coating layer such as plain paper or non-coated paper or a recording medium having permeability, for example, a recording medium having a coating layer such as glossy paper or coated paper. Among them, a recording medium having paper as a base material is preferred, with a recording medium having paper as a base material and having no coating layer being more preferred.

(Ink)

The ink to be used in the recording method of the invention is an aqueous ink for ink jet. This ink has a viscosity $\eta_1$ (mPa·s) of 5.0 mPa·s or more. A difference $\eta_2 - \eta_1$ between a viscosity $\eta_2$ (mPa·s) of an evaporated ink obtained by evaporating 20% by mass of the ink and the viscosity $\eta_1$ (mPa·s) of the ink is 4.0 mPa·s or more. The ink to be used in the recording method of the invention is not necessarily a so-called "curable ink". The ink of the invention therefore does not necessarily contain a compound such as polymerizable monomer which can be polymerized by the application of external energy. The constituent components and physical properties of the ink will hereinafter be described in detail.

[Coloring Material]

As the coloring material, a pigment or a dye can be used. The content (% by mass) of the coloring material in the ink is preferably 0.5% by mass or more to 15.0% by mass or less based on the total mass of the ink, with 1.0% by mass or more to 10.0% by mass or less being more preferred.

Specific examples of the pigment include inorganic pigments such as carbon black and titanium oxide and organic pigments such as azo, phthalocyanine, quinacridone, isoindolinone, imidazolone, diketopyrrolopyrrole and dioxazine. Of these, carbon black, azo pigments, phthalocyanine pigments and quinacridone pigments are preferred. The following are preferred specific examples of the organic pigment having C.I. number.

Examples of the azo pigment include C.I. Pigment Yellow 74. Those of the phthalocyanine pigment include C.I. Pigment Blue 15:3, C.I. Pigment Blue 15:4 and C.I. Pigment Blue 15:6. Those of the quinacridone pigment include C.I. Pigment Violet 19, C.I. Pigment Red 122, C.I. Pigment Red 202 and a solid solution of a plurality of quinacridone pigments.

As the pigment, when classified by a dispersing method, a resin-dispersed pigment using a resin as a dispersant or a self-dispersible pigment obtained by bonding a hydrophilic group to the surface of the pigment particle can be used. As well, a resin bonded pigment obtained by chemically bonding a resin-containing organic group to the surface of the pigment particle or a microcapsule pigment obtained by covering the surface of the pigment particle or encapsulating the pigment particle with a resin or the like can be used.

The resin dispersant for dispersing the pigment in an aqueous medium is preferably that capable of dispersing the pigment in an aqueous medium by the action of its anionic group. As the resin dispersant, resins described later, particularly water-soluble resins can be used. A mass ratio of the content (% by mass) of the pigment to the content of the resin dispersant in the ink is preferably 0.3 times or more to 10.0 times or less.

As the self-dispersible pigment, usable are those having an anionic group such as carboxylic acid group, sulfonic acid group or phosphonic acid group bonded to the surface of the pigment particle directly or via another atomic group (—R—). The anionic group may be present in either of an acid or salt form. In the latter case, either a portion or the whole of the salt may be dissociated. Examples of a cation which is the counter ion of the anionic group in salt form include alkali metal cations, ammonium and organic ammoniums. Specific examples of the another atomic group (—R—) include linear or branched alkylene groups having 1 to 12 carbon atoms, arylene groups such as phenylene and naphthylene, carbonyl groups, imino groups, amide groups, sulfonyl groups, ester groups and ether groups. As the another atomic group, these groups may be used in combination.

As the dye, that having an anionic group is preferred. Specific examples of the dye include azo, triphenylmethane, (aza)phthalocyanine, xanthene and anthrapyridone dyes.

As the coloring material, the pigments are preferably used. Among them, the self-dispersible pigment or the resin-dispersed pigment making use of a water-soluble resin as a dispersant is more preferred.

[Resin]

The ink may contain a resin. The content (% by mass) of the resin in the ink is preferably 0.1% by mass or more to 20.0% by mass or less, more preferably 0.5% by mass or more to 15.0% by mass or less, each based on the total mass of the ink.

The resin can be added to the ink for (i) stabilizing the dispersion state of the pigment, in other words, allowing it to serve as a resin dispersant or an auxiliary agent thereof. It can also be added for (ii) improving various properties of an image to be recorded. Examples of the form of the resin include block copolymers, random copolymers and graft copolymers, and combinations thereof The resin may be a water-soluble resin, that is, a resin soluble in an aqueous medium or may be a resin particle dispersible in an aqueous medium. The resin particle does not necessarily include the coloring material therein.

The term "resin is water soluble" as used herein means that in the case where the resin is neutralized with an alkali equivalent to the acid value, the resin is present in an aqueous medium without forming a particle having a particle size measurable by dynamic light scattering. Whether the resin is water soluble or not can be determined by the following method. First, a liquid containing a resin (resin solid content: 10% by mass) neutralized with an alkali (sodium hydroxide, potassium hydroxide, or the like) equivalent to the acid value is prepared. Then, the liquid thus prepared is diluted to 10 times (based on volume) with pure water to prepare a sample solution. The particle size of the resin in the sample solution is measured by dynamic light scattering. If a particle having a particle size cannot be measured, the resin can be determined as water soluble. The measurement conditions at this time can be set, for example, as follows:

[Measurement Condition]

SetZero: 30 seconds

Measurement times: 3

Measurement time: 180 seconds.

As a particle size distribution analyzers, a dynamic light scattering particle size analyzer (for example, "UPA-EX150"; trade name; product of NIKKISO) can be used. It is needless to say that a particle size distribution analyzer and measurement conditions are not limited to the above-described ones.

The water-soluble resin has preferably an acid value of 100 mgKOH/g or more to 250 mgKOH/g or less. The resin constituting the resin particle has preferably an acid value of 5 mgKOH/g or more to 100 mgKOH/g or less. The water-soluble resin has preferably a weight-average molecular weight of 3,000 or more to 15,000 or less. The resin constituting the resin particle has preferably a weight average molecular weight of 1,000 or more to 2,000,000 or less. The resin particle has preferably an average particle size (volume-based 50% cumulative particle size (D50)), as measured by dynamic light scattering, of 100 nm or more to 500 nm or less.

Examples of the resin include acrylic resins, urethane-based resins, and olefin-based resins. Of these, acrylic resins and urethane-based resins are preferred.

As the acrylic resins, those having a hydrophilic unit and a hydrophobic unit as a constitution unit are preferred. Of these, resins having a hydrophilic unit derived from (meth) acrylic acid and a hydrophobic unit derived from at least one of an aromatic ring-containing monomer and a (meth) acrylate-based monomer are preferred. Particularly preferred are resins having a hydrophilic unit derived from (meth)acrylic acid and a hydrophobic unit derived from at least one of styrene and α-methylstyrene monomers. These resins easily cause interaction with the pigment so that they can preferably be used as a resin dispersant for dispersing the pigment.

The hydrophilic unit is a unit having a hydrophilic group such as anionic group. The hydrophilic unit can be formed, for example, by polymerizing a hydrophilic monomer having a hydrophilic group. Specific examples of the hydrophilic monomer having a hydrophilic group include acidic monomers having a carboxylic acid group such as (meth) acrylic acid, itaconic acid, maleic acid or fumaric acid and anionic monomers such as anhydrides or salts of these acidic monomers. Examples of a cation constituting the salt of the acidic monomer include ions such as lithium, sodium, potassium, ammonium, and organic ammonium. The hydrophobic unit is a unit not having a hydrophilic group such as anionic group. The hydrophobic unit can be obtained by polymerizing a hydrophobic monomer not having a hydrophilic group such as anionic group. Specific examples of the hydrophobic monomer include aromatic ring-containing monomers such as styrene, α-methylstyrene and benzyl (meth)acrylate and (meth)acrylate-based monomers such as methyl (meth)acrylate, butyl (meth)acrylate and 2-ethylhexyl (meth)acrylate. Monomers having an alkylene oxide group are also usable.

As the urethane-based resin, for example, that obtained by reacting a polyisocyanate with a polyol can be used. It may be obtained by reacting, in addition to them, with a chain extending agent. Examples of the olefin-based resin include polyethylene and polypropylene.

[Resin Particle Having a Unit Containing an Alkylene Oxide Group]

In the invention, a difference $\eta_2-\eta_1$ (viscosity difference $\eta_2-\eta_1$) between the viscosity $\eta_2$ (mPa·s) of an evaporated ink obtained by evaporating 20% by mass of the ink and the viscosity $\eta_1$ (mPa·s) of the ink is 4.0 mPa·s or more. If the composition of the ink is adjusted so that the evaporated ink has a viscosity sufficient for reducing minus curl by using only a polyhydric alcohol compound solid at 25° C. (which may hereinafter be called "polyhydric alcohol compound", simply) which will be described later, the amount of the polyhydric alcohol compound increases. An increase in the viscosity difference $\eta_2-\eta_1$ therefore makes the viscosity too high, making it difficult to sufficiently suppress smear. Described specifically, when the viscosity of the evaporated ink is adjusted by using only a polyhydric compound, it sometimes becomes difficult to simultaneously achieve a minus curl suppressing effect and a smear suppressing effect at high levels, because minus curl and smear are likely to have a trade-off relationship.

On the other hand, an ink having a viscosity $\eta_1$ adjusted only by a polyhydric alcohol compound in order to suppress smear cannot easily have an increased viscosity difference $\eta_2-\eta_1$ and such an ink sometimes has a slightly lower minus curl suppressing effect. In order to achieve a minus curl suppressing effect and a smear suppressing effect at high levels, it is preferred to reduce the viscosity $\eta_1$ of the ink and at the same time, increase the viscosity difference $\eta_2-\eta_1$. As a result of investigation, the present inventors have found that an ink containing both a polyhydric alcohol compound and a resin particle having a unit containing an alkylene oxide group is effective. Compared with an ink containing only a polyhydric alcohol compound, an ink containing it and also a resin particle having a unit containing an alkylene oxide group can have a lower viscosity $\eta_1$ and a higher viscosity difference $\eta_2-\eta_1$.

The resin particle having a unit containing an alkylene oxide group tends to lower the viscosity $\eta_1$ of an ink compared with the same amount of the polyhydric alcohol compound. This is presumed because compared with the polyhydric alcohol compound or water-soluble resin solid at 25° C., the resin particle has less intermolecular steric interaction due to its particle form. On the other hand, with evaporation of the water in the ink, the polyhydric alcohol compound and the resin particle are likely to cause an interaction. It is however presumed that the hydroxyl group of the polyhydric alcohol compound and the alkylene oxide group of the resin particle react with each other by hydrogen bonding to enhance the viscosity difference $\eta_2-\eta_1$.

The resin particle having a unit containing an alkylene oxide group further has preferably a hydrophilic unit and a hydrophobic unit exemplified above as the preferred unit constituting the acrylic resin. The percentage (% by mass) of the unit containing the alkylene oxide group in the resin particle is preferably 3.0% by mass or more. This makes it possible to efficiently enhance the viscosity difference $\eta_2-\eta_1$ and thereby reducing occurrence of minus curl more. The percentage (% by mass) of the unit containing the alkylene oxide group in the resin particle is preferably 10.0% by mass or less, more preferably 5.0% by mass or less.

[Alkylene Oxide Group-containing Monomer]

Examples of the alkylene oxide group include an ethylene oxide group and a propylene oxide group. The unit containing the alkylene oxide group can be formed by polymerizing an alkylene oxide group-containing monomer. Examples of the alkylene oxide group-containing monomer include (poly)alkylene glycol (meth)acrylates such as ethylene glycol (meth)acrylate, triethylene glycol (meth)acrylate and propylene glycol (meth)acrylate, alkoxy(poly)alkylene glycol (meth)acrylates such as methoxyethylene glycol (meth)acrylate, methoxytriethylene glycol (meth)acrylate, ethoxyethylene glycol (meth)acrylate and methoxypropylene glycol (meth)acrylate and aryloxy(poly)alkylene glycol (meth)acrylates such as phenoxyethylene glycol (meth)acrylate, phenoxytriethylene glycol (meth)acrylate and phenoxypropylene glycol (meth)acrylate. As the alkylene oxide group-containing monomer, an alkylene oxide group-containing reactive surfactant can also be used.

The unit containing the alkylene oxide group is preferably derived from a monomer having eight or more alkylene oxide groups. This means that the number of alkylene oxide groups in an alkylene oxide group-containing monomer is preferably eight or more. Use of a resin particle containing a unit derived from a monomer having eight or more alkylene oxide groups makes it possible to enhance the viscosity difference $\eta_2-\eta_1$ reduce the occurrence of minus curl. The number of the alkylene oxide groups is preferably 15 or less, more preferably 12 or less. The term "number of the alkylene oxide groups" in the alkylene oxide group-containing monomer as used herein means, for example, "the total number of ethylene oxide groups and propylene oxide groups" when ethylene oxide groups and propylene oxide groups are used.

Surface charge amount (μmol/g) of the resin particle having a unit containing an alkylene oxide group is preferably 500 μmol/g or less. The surface charge amount more than 500 μmol/g may increase the amount of an ion present in the ink due to the resin particle. Salting out of the pigment (particularly, pigment dispersed by the action of an anionic group) occurs easily due to evaporation of water and the viscosity difference $\eta_2-\eta_1$ is enhanced excessively. This may slightly deteriorate a smear suppressing effect. The surface charge amount of the resin particle is preferably 1 μmol/g or more, more preferably 100 μmol/g or more.

The surface charge amount of the resin particle can be measured by colloidal titration. More specifically, a resin particle collected from an ink by an appropriate method is added to water. The resulting mixture is adjusted to pH 2 with a mineral acid such as hydrochloric acid, followed by stirring for 24 hours. Then, the reaction mixture is centrifuged and a resin thus precipitated is collected and dried. To 1 g of a ground resin, 30 g of a 0.1 mol/L aqueous sodium bicarbonate solution is added and the resulting mixture is stirred for 15 hours to obtain a liquid containing the resin. To 1 g of the resulting liquid is diluted with pure water to obtain 15 g of a diluted liquid. The resin particle in the resulting diluted liquid is subjected to colloidal titration making use of a potential difference and a charge per unit mass of the resin particle is obtained. By dividing the charge thus obtained by the surface area of the resin particle calculated from the volume-based 50% cumulative particle size ($D_{50}$), the surface charge amount of the resin particle can be determined. The titration can be performed using a titration apparatus such as a potentiometric automatic titration apparatus ("AT-510", trade name; product of Kyoto Electronics) having therein a flow potentiometric titration unit (PCD-500) and also using a titration reagent such as 0.1 mol/L hydrochloric acid. It is needless to say that the titrator and measurement conditions are not limited to those described above.

[Aqueous Medium]

The ink to be used in the recording method of the invention is an aqueous ink containing, as an aqueous medium, at least water. The ink may contain water or an aqueous medium which is a mixed solvent of water and a water-soluble organic solvent. The water is preferably deionized water or ion exchanged water. The content (% by mass) of the water in the aqueous ink is preferably 30.0% by mass or more to 95.0% by mass or less based on the total mass of the ink. As described above, of liquid components constituting the aqueous ink for inkjet, water can swell the recording medium most easily. Reduction in the amount of water in the ink is therefore more effective for suppressing minus curl. The content (% by mass) of water in the aqueous ink is preferably 66.0% by mass or less based on the total mass of the ink, with 35.0% by mass or more to 65.0% by mass or less being more preferred.

The content (% by mass) of the water-soluble organic solvent in the ink is preferably 3.0% by mass or more to 50.0% by mass or less based on the total mass of the ink. The term "content of the water-soluble organic solvent" as used herein means a value of it including a polyhydric alcohol compound solid at 25° C. which will be described later. As the water-soluble organic solvent, any of alcohols, (poly)alkylene glycols, glycol ethers, nitrogen-containing compounds, sulfur-containing compounds and the like usable for ink jet inks can be used.

The term "water-soluble organic solvent" ordinarily means a liquid, but in the invention, it includes a water-soluble organic solvent solid at 25° C. (normal temperature). Specific examples of the water-soluble organic solvent generally used for an aqueous ink and solid at 25° C. include 1,6-hexanediol, trimethylolpropane, ethylene urea, urea and polyethylene glycol having a number average molecular weight of 1,000. Some of them may be classified into the polyhydric alcohol compound solid at 25° C.

[Polyhydric alcohol Compound Solid at 25° C.]

As described above, minus curl can be suppressed by increasing the viscosity of the evaporated ink. Excessive increase in the viscosity of the evaporated ink however may cause smear more easily. The viscosity of the evaporated ink can be increased by various methods. For example, when a pigment to be dispersed by the action of an anionic group is used, the viscosity of the evaporated ink can be adjusted by controlling the kind or content of the following component. Specific examples include water-soluble metal salts such as calcium salt, water-soluble organic solvents such as poor solvent, resins such as water-soluble resin and resin particle and polyhydric alcohol compounds solid at 25° C.

It has been revealed that of these, the polyhydric alcohol compound solid at 25° C. is preferred. When the metal salt or resin (particularly, water-soluble resin) is used, even a small amount it markedly increases the viscosity of the evaporated ink. The ink therefore tends to remain on the surface of a recording medium and smear tends to occur. Reduction in the content of the metal salt or resin to a level at which smear is suppressed, on the other hand, makes it difficult to enhance the viscosity of the evaporated ink. Also a compound such as urea or betaine compound has difficulty in enhancing the viscosity of the evaporated ink.

On the other hand, smear can be suppressed more effectively by incorporating, in an ink, an adequate amount of a polyhydric alcohol compound solid at 25° C. The polyhydric alcohol compound solid at 25° C. has high crystallinity and when water is evaporated, a plurality of molecules is likely to cause interaction. Further, the polyhydric alcohol compound solid at 25° C. has, in one molecule thereof, a plurality of hydroxyl groups so that interaction due to hydrogen bonding also occurs. Such interactions contribute to enhance the viscosity of the evaporated ink within a range effective for suppressing minus curl. The content (% by mass) of the polyhydric alcohol compound in the ink is preferably 10.0% by mass or more, more preferably 35.0% by mass or less, particularly preferably 20.0% by mass or less, each based on the total mass of the ink.

No limitation is imposed on the polyhydric alcohol compound solid at 25° C. insofar as it satisfies this condition. In particular, a compound having a main chain (hydrocarbon chain) with 1 to 6 carbon atoms is preferred. Specific examples include 1,6-hexanediol, trimethylolpropane, trimethylolethane and sorbitol. Of these, trimethylolpropane is preferred.

A mass ratio, in the ink, of the content (% by mass) of the resin particle having a unit containing an alkylene oxide group to the content (% by mass) of the polyhydric alcohol compound solid at 25° C. is preferably 0.25 times or more to 1.00 time or less. At the mass ratio of less than 0.25 times, it sometimes becomes slightly difficult to suppress smear because the content of the polyhydric alcohol compound is relatively larger than that of the resin particle so that an increase in the viscosity difference $\eta_2-\eta_1$ to some extent inevitably increases the viscosity $\eta_1$ of the ink. At the mass ratio of more than 1.00 time, on the other hand, it sometimes becomes slightly difficult to suppress minus curl because the content of the polyhydric alcohol compound is relatively smaller than that of the resin particle and a sufficient increase in the viscosity difference $\eta_2-\eta_1$ cannot be achieved easily.

[Other Additive]

The ink may contain, in addition to the above-described components, various additives such as surfactant, anti-foaming agent, pH regulator, viscosity modifier, rust preventive, antiseptic agent, mildew proofing agent, antioxidant and reduction preventive as needed.

[Physical Properties of Ink]

The ink has a viscosity $\eta_1$ (mPa·s) of 5.0 mPa·s or more, preferably 15.0 mPa·s or less, more preferably 10.0 mPa·s or less. The evaporated ink obtained by evaporating 20% by mass of the ink has a viscosity $\eta_2$ (mPa·s) of 9.0 mPa·s or more, more preferably 10.0 mPa·s or more. In addition, the evaporated ink has preferably a viscosity $\eta_2$ (mPa·s) of 25.0 mPa·s or less, more preferably 20.0 mPa·s or less.

A difference $\eta_2-\eta_1$ between the viscosity $\eta_2$ (mPa·s) of the evaporated ink obtained by evaporating 20% by mass of the ink and the viscosity (mPa·s) of the ink is 4.0 mPa·s or more, preferably 15.0 mPa·s or less, more preferably 10.0 mPa·s or less. The viscosity of the ink and the evaporated ink can be controlled by adjusting the kind or content of the polyhydric alcohol compound solid at 25° C., the water-soluble organic solvent, or the resin.

In order to suppress evaporation of the aqueous ink for ink jet, it is usually stored in a container such as an ink cartridge and ink bottle or the resulting container is put further in a hermetically sealable bag. The ink taken out from such a container has a viscosity equal to that at the time of ink preparation so that it has a viscosity of $\eta_1$ and an ink obtained by evaporating 20% by mass of the ink taken out from the container has a viscosity of $\eta_2$.

The ink to be used in the recording method of the invention is an aqueous ink ejected from an ink jet system recording head. From the standpoint of reliability, proper control of its physical property values is desired. Described specifically, the ink has preferably a surface tension at 25° C. of 20 mN/m or more to 60 mN/m or less. In addition, the ink has preferably a pH at 25° C. of 7.0 or more to 9.5 or less, more preferably 8.0 or more to 9.5 or less.

EXAMPLES

The invention will hereinafter be described in further detail by Examples, Comparative Examples and Referential Examples. The invention is not limited by the following Examples insofar as it does not depart from the gist of the invention. With respect to the amount of components, all designations of "part" or "parts" and "%" are on a mass basis unless otherwise particularly indicated.

<Measurement Conditions of Physical Properties>

(Surface Charge Amount)

Hydrochloric acid was added to a liquid containing a material to be measured to adjust the pH of the liquid to 2 and the resulting mixture was stirred for 24 hours. The reaction mixture was centrifuged and a solid matter thus precipitated was collected, dried and ground into a sample. To 1 g of the sample thus obtained was added 30 g of a 0.1 mol/L aqueous solution of sodium bicarbonate. After stirring for 15 hours, the reaction mixture was centrifuged to collect a supernatant. A liquid obtained by adding pure water to 1 g of the supernatant and diluting to 15 g was titrated with 0.1 mol/L hydrochloric acid by using a potentiometric automatic titration apparatus ("AT-510", trade name; product of Kyoto Electronics) to measure a charge of the resin particle. The charge thus measured was divided by the surface area of the resin particle calculated from the volume-based 50% cumulative particle size ($D_{50}$) measured by a method described later to determine the surface charge amount of the resin particle.

(Volume-based 50% Cumulative Particle Size ($D_{50}$))

Ion exchanged water was added to a liquid containing a material to be measured and a sample having a solid content of about 1.0% was prepared. The volume distribution based particle size at 50% ($D_{50}$) of the resin particle was measured under the following measurement conditions by using a dynamic light scattering particle size analyzer ("UPA-EX150", trade name; product of NIKKISO). The resin having a particle size unmeasurable by the above method is determined as a "water-soluble" resin.

[Measurement Conditions]
SetZero: 30 seconds
Measurement times: 3
Measurement time: 180 seconds, refractive index: 1.5

<Preparation of Pigment Dispersion Liquid>

(Pigment Dispersion Liquids 1 to 4)

A batch type vertical sand mill (product of Aimex) filled with 200 parts of zirconia beads having a diameter of 0.3 mm was charged with a mixture of 25.0 parts of a pigment, 25.0 parts of a resin aqueous solution, and 50.0 parts of pure water. The mixture was dispersed for 5 hours while cooling with water. As the pigment, C.I. Pigment Red 122 was used. As the resin aqueous solution, used was an aqueous solution having a resin (solid) content of 20.0% and obtained by dissolving a styrene-ethyl acrylate-acrylic acid copolymer having an acid value of 150 mgKOH/g and a weight average molecular weight of 8,000 in water containing potassium hydroxide equimolar to the acid value of the copolymer. The resulting dispersion liquid was pressure filtered through a cellulose acetate filter having a pore size of 3.0 μm (product of Advantec) to obtain Pigment dispersion liquid 1. The pigment content and the resin content in Pigment dispersion liquid 1 were 25.0% and 5.0%, respectively.

Pigment dispersion liquids 2 to 4 having a pigment content of 25.0% and a resin content of 5.0% were obtained in a manner similar to that used for preparation of Pigment dispersion liquid 1 except that the pigment was changed to C.I. Pigment Blue 15:3, C.I. Pigment Yellow 74 and carbon black, respectively.

(Pigment Dispersion Liquid 5)

A solution obtained by dissolving 5.0 g of concentrated hydrochloric acid in 5.5 g of water was cooled to 5° C. and 1.1 g of 4-aminophthalic acid was added under that state. A container having the resulting solution therein was placed in an ice bath and while stirring and retaining the temperature of the solution at 10° C. or less, a solution obtained by dissolving 1.8 g of sodium nitrite in 9.0 g of ion exchanged water of 5° C. was added. After stirring for 15 minutes, 6.0 g of carbon black (specific surface area: 220 m²/g, DBP oil absorption: 105 mL/100 g) was added under stirring. Stirring was continued for further 15 minutes to obtain a slurry. The slurry thus obtained was filtered through a filter paper ("Standard filter paper No. 2", trade name; product of Advantec). The particle was washed with water sufficiently and dried in an oven of 110° C. Then, a sodium ion was substituted by a potassium ion by ion exchange method to obtain a self-dispersible pigment having a —$C_6H_3$—$(COOK)_2$ group bonded to the particle surface of the carbon black. An adequate amount of water was added to adjust the content of the resulting pigment and Pigment dispersion liquid 5 having a pigment content of 25.0% was obtained.

(Pigment Dispersion Liquid 6)

A "copper phthalocyanine pigment-containing fine polymer particle dispersion" was prepared based on the description in Preparation Example 1 of Japanese Patent Application Laid-Open No. 2005-320509 and the resulting dispersion was used as Pigment dispersion liquid 6. The pigment content and the resin content in Pigment dispersion liquid 6 were 13.0% and 7.0%, respectively.

<Synthesis of Resin>

A four-necked flask equipped with a stirrer, a reflux condenser and a nitrogen gas inlet tube was charged with 78.8 parts of ion exchanged water and 0.2 part of potassium persulfate (polymerization initiator) and was introduced with a nitrogen gas. The resulting mixture was stirred and its temperature was raised to 80° C. A mixture of the monomers whose kind and amount (unit: part) were shown in the upper rows of Table 1 were added dropwise to the flask for 2 hours. After aging for 2 hours, the reaction mixture was cooled to 25° C. Adequate amounts of potassium hydroxide and ion exchanged water were added to adjust its pH to 8.5 and an aqueous dispersion liquid of a resin particle having a resin (solid) content of 30.0% was obtained. The physical properties of the resin particle are shown in the lower rows of Table 1. Surfactants 1 to 6 are each a compound having the structure shown below. In the formula, R represents an alkylene oxide group and n stands for the number of R (alkylene oxide group). When n=0, R represents a single bond.

TABLE 1

| Synthesis conditions and properties of resin particle | | | | | | | | | | | | | | | |
|---|---|---|---|---|---|---|---|---|---|---|---|---|---|---|---|
| | Resin particle | | | | | | | | | | | | | | |
| | 1 | 2 | 3 | 4 | 5 | 6 | 7 | 8 | 9 | 10 | 11 | 12 | 13 | 14 | 15 |
| Methyl methacrylate | | | | 87.2 | | | | | | | | | | | |
| Ethyl methacrylate | 87.2 | 87.2 | 87.2 | | | | 88.7 | 87.7 | 85.7 | 87.2 | 87.2 | 87.2 | 88.8 | 81.5 | 79.5 |
| Butyl methacrylate | | | | | 87.2 | | | | | | | | | | |
| Styrene | | | | | | 87.2 | | | | | | | | | |
| Methacrylic acid | 3.3 | 3.3 | 3.3 | 3.3 | 3.3 | 3.3 | 3.3 | 3.3 | 3.3 | 3.3 | 3.3 | 3.3 | 1.7 | 9.0 | 11.0 |
| Ethylene glycol dimethacrylate | 6.0 | 6.0 | 6.0 | 6.0 | 6.0 | 6.0 | 6.0 | 6.0 | 6.0 | 6.0 | 6.0 | 6.0 | 6.0 | 6.0 | 6.0 |
| Surfactant 1 (10 ethylene oxide groups) | 3.5 | | | 3.5 | 3.5 | 3.5 | 2.0 | 3.0 | 5.0 | | | | 3.5 | 3.5 | 3.5 |
| Surfactant 2 (no alkylene oxide group) | | 3.5 | | | | | | | | | | | | | |
| Surfactant 3 (10 propylene oxide groups) | | | 3.5 | | | | | | | | | | | | |
| Surfactant 4 (6 ethylene oxide groups) | | | | | | | | | | 3.5 | | | | | |
| Surfactant 5 (8 ethylene oxide groups) | | | | | | | | | | | 3.5 | | | | |
| Surfactant 6 (12 ethylene oxide groups) | | | | | | | | | | | | 3.5 | | | |
| Percentage (%) of alkylene oxide group-containing unit | 3.5 | 0.0 | 3.5 | 3.5 | 3.5 | 3.5 | 2.0 | 3.0 | 5.0 | 3.5 | 3.5 | 3.5 | 3.5 | 3.5 | 3.5 |
| Surface charge amount (μmol/g) | 200 | 200 | 200 | 200 | 200 | 200 | 200 | 200 | 200 | 200 | 200 | 200 | 100 | 500 | 600 |

(Aqueous Solution of Resin 1)

A four-necked flask equipped with a stirrer, a reflux condenser and a nitrogen gas inlet tube was charged with 100.0 parts of ethylene glycol monobutyl ether and was then introduced with a nitrogen gas. The resulting mixture was stirred and the temperature was elevated to 110° C. To the flask, a mixture of 17.0 parts of acrylic acid, 20.0 parts of n-butyl acrylate and 63.0 parts of styrene and an ethylene glycol monobutyl ether solution of 1.3 parts of t-butyl peroxide (polymerization initiator) was added dropwise for 3 hours. After aging for 2 hours, the ethylene glycol monobutyl ether was removed under reduced pressure to obtain a solid resin. To the resin thus obtained were added potassium hydroxide equivalent to the acid value of the resin and an adequate amount of ion exchanged water. The resulting mixture was heated to 80° C. to dissolve the resin to obtain an aqueous solution of Resin 1 having a resin (solid) content of 15.0%. Resin 1 was a water-soluble resin.

<Preparation of Ink>

After components (unit: %) shown in the upper rows of Table 2 were mixed and stirred sufficiently, the reaction mixture was pressure filtered through a membrane filter ("HDCII filter", trade name; product of Pall) having a pore size of 1.2 gm to prepare each ink. In Table 2, the numerical value attached to polyethylene glycol is a number average molecular weight and "Acetylenol E60" is the trade name of a surfactant produced by Kawaken Fine Chemicals. The properties of the inks were shown in the lower rows of Table 2. The viscosity was measured at 25° C. by using an E type viscometer (product of Toki Sangyo).

TABLE 2

Composition and properties of ink

| | Ink | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Kind of pigment dispersion liquid | 1 | 2 | 3 | 4 | 5 | — | 1 | 1 | 1 | 1 | 1 | 1 | 1 | 1 | 1 | 1 |
| Kind of resin particle | 1 | 1 | 1 | 1 | 1 | 1 | 1 | 1 | 1 | 1 | 1 | 1 | 1 | 1 | 1 | 1 |
| Pigment dispersion liquid | 20.0 | 20.0 | 20.0 | 20.0 | 20.0 | 0.0 | 12.0 | 20.0 | 20.0 | 20.0 | 20.0 | 20.0 | 20.0 | 20.0 | 20.0 | 20.0 |
| Aqueous dispersion liquid of resin particle | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 |
| C.I. Acid Yellow 23 | | | | | | 20.0 | | | | | | | | | | |
| Aqueous solution of Resin 1 | | | | | | | | | | | | | | | | |
| Glycerin | 12.0 | 12.0 | 12.0 | 12.0 | 12.0 | 12.0 | 12.0 | 5.2 | 4.2 | 12.0 | 12.0 | 12.0 | 12.0 | 12.0 | 12.0 | 12.0 |
| 1,2-Hexanediol | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| 1,3-Butanediol | | | | | | | | | | | | | | | | |
| 2-Ethyl-1,3-hexanediol | | | | | | | | | | | | | | | | |
| Trimethylolethane | | | | | | | | | | | 15.0 | | | | | |
| Trimethylolpropane | 15.0 | 15.0 | 15.0 | 15.0 | 15.0 | 15.0 | 15.0 | 15.0 | 15.0 | | 7.0 | 10.0 | | | | |
| Sorbitol | | | | | | | | | | | 4.0 | | | | | |
| Diethylene glycol | | | | | | | | | | | | | | | | |
| Triethylene glycol | | | | | | | | | | | | | | | | |
| Polyethylene glycol 200 | | | | | | | | | | | | | 15.0 | | | |
| Polyethylene glycol 1000 | | | | | | | | | | | | 5.0 | | | | |
| Triethylene glycol monobutyl ether | | | | | | | | | | | | | | 15.0 | | |
| Tetraethylene glycol monobutyl ether | | | | | | | | | | | | | | | | |
| 2-Pyrrolidone | | | | | | | | | | | | | | | | |
| Trimethylglycine | | | | | | | | | | | | | | | 15.0 | |
| Ethylene urea | | | | | | | | | | | | | | | | 15.0 |
| 1,3-Bis(2-hydroxyethyl)-5,5-dimethylhidantoin | | | | | | | | | | | | | | | | |
| 1-(2-Hydroxyethyl)-2-pyrrolidone | | | | | | | | | | | | | | | | |
| Acetylenol E60 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |
| Ammonium phthalate | | | | | | | | | | | | | | | | |
| Ion exchanged water | 31.2 | 31.2 | 31.2 | 31.2 | 31.2 | 31.2 | 39.2 | 38.0 | 39.0 | 31.2 | 35.2 | 31.2 | 31.2 | 31.2 | 31.2 | 31.2 |
| Content (%) of water | 59.2 | 59.2 | 59.2 | 59.2 | 59.2 | 45.2 | 61.6 | 66.0 | 67.0 | 59.2 | 63.2 | 59.2 | 59.2 | 59.2 | 59.2 | 59.2 |
| Content A (%) of solid polyhydric alcohol | 15.0 | 15.0 | 15.0 | 15.0 | 15.0 | 15.0 | 15.0 | 15.0 | 15.0 | 15.0 | 11.0 | 10.0 | 0.0 | 0.0 | 0.0 | 0.0 |
| Content E (%) of resin particle | 6.0 | 6.0 | 6.0 | 6.0 | 6.0 | 6.0 | 6.0 | 6.0 | 6.0 | 6.0 | 6.0 | 6.0 | 6.0 | 6.0 | 6.0 | 6.0 |
| E/A Ratio | 0.40 | 0.40 | 0.40 | 0.40 | 0.40 | 0.40 | 0.40 | 0.40 | 0.40 | 0.40 | 0.55 | 0.60 | — | — | — | — |
| Viscosity $\eta_1$ (mPa · s) of ink | 8.0 | 8.0 | 8.0 | 8.0 | 8.0 | 8.0 | 5.0 | 5.5 | 5.2 | 7.5 | 8.5 | 8.5 | 6.0 | 6.0 | 5.5 | 5.5 |
| Viscosity $\eta_2$ (mPa · s) of 20% evaporated ink | 16.0 | 16.0 | 16.0 | 16.0 | 16.0 | 16.0 | 13.0 | 12.0 | 11.0 | 15.5 | 18.0 | 17.0 | 10.0 | 10.0 | 9.5 | 9.5 |
| $\eta_2 - \eta_1$ (mPa · s) | 8.0 | 8.0 | 8.0 | 8.0 | 8.0 | 8.0 | 8.0 | 6.5 | 5.8 | 8.0 | 9.5 | 8.5 | 4.0 | 4.0 | 4.0 | 4.0 |

| | Ink | | | | | | | | | | | | | | | |
|---|---|---|---|---|---|---|---|---|---|---|---|---|---|---|---|---|
| | 17 | 18 | 19 | 20 | 21 | 22 | 23 | 24 | 25 | 26 | 27 | 28 | 29 | 30 | 31 | 32 |
| Kind of pigment dispersion liquid | 1 | 1 | 1 | 1 | 1 | 1 | 1 | 1 | 1 | 1 | 1 | 1 | 1 | 1 | 1 | 1 |
| Kind of resin particle | 1 | 1 | — | 2 | — | 2 | 3 | 4 | 5 | 6 | 7 | 8 | 9 | 10 | 11 | 12 |
| Pigment dispersion liquid | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 |
| Aqueous dispersion liquid of resin particle | 20.0 | 20.0 | | 20.0 | | 20.0 | 20.0 | 20.0 | 20.0 | 20.0 | 20.0 | 20.0 | 20.0 | 20.0 | 20.0 | 20.0 |
| C.I. Acid Yellow 23 | | | | | | | | | | | | | | | | |
| Aqueous solution of Resin 1 | | | | | | | | | | | | | | | | |
| Glycerin | 18.0 | 17.0 | 12.0 | 12.0 | 12.0 | 12.0 | 12.0 | 12.0 | 12.0 | 12.0 | 12.0 | 12.0 | 12.0 | 12.0 | 12.0 | 12.0 |

TABLE 2-continued

Composition and properties of ink

| | | | | | | | | | | | | | | | | |
|---|---|---|---|---|---|---|---|---|---|---|---|---|---|---|---|---|
| 1,2-Hexanediol | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| 1,3-Butanediol | | | | | | | | | | | | | | | | |
| 2-Ethyl-1,3-hexanediol | | | | | | | | | | | | | | | | |
| Trimethylolethane | | | | | | | | | | | | | | | | |
| Trimethylolpropane | 9.0 | 10.0 | 20.0 | 15.0 | 30.0 | 35.0 | 15.0 | 15.0 | 15.0 | 15.0 | 15.0 | 15.0 | 15.0 | 15.0 | 15.0 | 15.0 |
| Sorbitol | | | | | | | | | | | | | | | | |
| Diethylene glycol | | | | | | | | | | | | | | | | |
| Triethylene glycol | | | | | | | | | | | | | | | | |
| Polyethylene glycol 200 | | | | | | | | | | | | | | | | |
| Polyethylene glycol 1000 | | | | | | | | | | | | | | | | |
| Triethylene glycol monobutyl ether | | | | | | | | | | | | | | | | |
| Tetraethylene glycol monobutyl ether | | | | | | | | | | | | | | | | |
| 2-Pyrrolidone | | | | | | | | | | | | | | | | |
| Trimethylglycine | | | | | | | | | | | | | | | | |
| Ethylene urea | | | | | | | | | | | | | | | | |
| 1,3-Bis(2-hydroxyethyl)-5,5-dimethylhidantoin | | | | | | | | | | | | | | | | |
| 1-(2-Hydroxyethyl)-2-pyrrolidone | | | | | | | | | | | | | | | | |
| Acetylenol E60 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |
| Ammonium phthalate | | | | | | | | | | | | | | | | |
| Ion exchanged water | 31.2 | 31.2 | 46.2 | 31.2 | 36.2 | 11.2 | 31.2 | 31.2 | 31.2 | 31.2 | 31.2 | 31.2 | 31.2 | 31.2 | 31.2 | 31.2 |
| Content (%) of water | 59.2 | 59.2 | 60.2 | 59.2 | 50.2 | 39.2 | 59.2 | 59.2 | 59.2 | 59.2 | 59.2 | 59.2 | 59.2 | 59.2 | 59.2 | 59.2 |
| Content A (%) of solid polyhydric alcohol | 9.0 | 10.0 | 20.0 | 15.0 | 30.0 | 35.0 | 15.0 | 15.0 | 15.0 | 15.0 | 15.0 | 15.0 | 15.0 | 15.0 | 15.0 | 15.0 |
| Content E (%) of resin particle | 6.0 | 6.0 | 0.0 | 6.0 | 0.0 | 6.0 | 6.0 | 6.0 | 6.0 | 6.0 | 6.0 | 6.0 | 6.0 | 6.0 | 6.0 | 6.0 |
| E/A Ratio | 0.67 | 0.60 | 0.00 | 0.40 | 0.00 | 0.17 | 0.40 | 0.40 | 0.40 | 0.40 | 0.40 | 0.40 | 0.40 | 0.40 | 0.40 | 0.40 |
| Viscosity $\eta_1$ (mPa·s) of ink | 5.3 | 5.5 | 8.0 | 8.0 | 14.0 | 14.0 | 8.0 | 8.0 | 8.0 | 8.0 | 8.0 | 8.0 | 8.0 | 8.0 | 8.0 | 8.0 |
| Viscosity $\eta_2$ (mPa·s) of 20% evaporated ink | 9.3 | 11.0 | 12.0 | 12.0 | 22.0 | 22.0 | 16.0 | 16.0 | 16.0 | 16.0 | 12.0 | 14.0 | 18.0 | 13.5 | 15.0 | 15.0 |
| $\eta_2 - \eta_1$ (mPa·s) | 4.0 | 5.5 | 4.0 | 4.0 | 8.0 | 8.0 | 8.0 | 8.0 | 8.0 | 8.0 | 4.0 | 6.0 | 10.0 | 5.5 | 7.0 | 7.0 |

| | Ink | | | | | | | | | | | | | | | | |
|---|---|---|---|---|---|---|---|---|---|---|---|---|---|---|---|---|---|
| | 33 | 34 | 35 | 36 | 37 | 38 | 39 | 40 | 41 | 42 | 43 | 44 | 45 | 46 | 47 | 48 | 49 |
| Kind of pigment dispersion liquid | 1 | 1 | 1 | 1 | 1 | 1 | 1 | 1 | 1 | 1 | 1 | — | 6 | 1 | 1 | 5 | 5 |
| Kind of resin particle | 13 | 14 | 15 | 1 | 1 | 1 | 1 | 1 | 1 | 1 | 1 | — | — | — | — | — | — |
| Pigment dispersion liquid | 20.0 | 20.0 | 20.0 | 20.0 | 20.0 | 20.0 | 20.0 | 20.0 | 20.0 | 10.0 | 20.0 | | 50.0 | 30.0 | 10.0 | 20.0 | 28.0 |
| Aqueous dispersion liquid of resin particle | 20.0 | 20.0 | 20.0 | 13.0 | 13.4 | 40.0 | 40.0 | 12.0 | 12.0 | 20.0 | 8.0 | | | | | | |
| C.I. Acid Yellow 23 | | | | | | | | | | | | 20.0 | | | | | |
| Aqueous solution of Resin 1 | | | | | | | | 12.0 | | | | | | | | | |
| Glycerin | 12.0 | 12.0 | 12.0 | 12.0 | 12.0 | 8.0 | 9.0 | 12.0 | 12.0 | 12.0 | 20.0 | 15.0 | 9.0 | 6.0 | | | 12.0 |
| 1,2-Hexanediol | 1.0 | 1.0 | 1.0 | 1.0 | 1.0 | 1.0 | 1.0 | 1.0 | 1.0 | 1.0 | 1.0 | | | 0.5 | | | |
| 1,3-Butanediol | | | | | | | | | | | | | 22.0 | | | | |
| 2-Ethyl-1,3-hexanediol | | | | | | | | | | | | | 1.8 | | | | |
| Trimethylolethane | | | | | | | | | | | | | | | | | |
| Trimethylolpropane | 15.0 | 15.0 | 15.0 | 16.0 | 16.0 | 12.0 | 11.0 | 10.0 | 10.0 | 15.0 | 6.0 | 10.0 | | 2.0 | | | |
| Sorbitol | | | | | | | | | | | | | | | | | |
| Diethylene glycol | | | | | | | | | | | | | | | | | 7.0 |
| Triethylene glycol | | | | | | | | | | | | | 1.0 | 14.0 | | | 4.0 |
| Polyethylene glycol 200 | | | | | | | | | | | | 7.0 | | | | | |
| Polyethylene glycol 1000 | | | | | | | | | | | | | | | | | |
| Triethylene glycol monobutyl ether | | | | | | | | | | | | | 2.0 | | | | |
| Tetraethylene glycol monobutyl ether | | | | | | | | | | | | | | | | | 2.0 |
| 2-Pyrrolidone | | | | | | | | | | | | | 3.0 | 7.0 | 8.0 | | 0.5 |
| Trimethylglycine | | | | | | | | | | | | | 11.0 | | | | |
| Ethylene urea | | | | | | | | | | | | | | | | | |
| 1,3-Bis(2-hydroxyethyl)-5,5-dimethylhidantoin | | | | | | | | | | | | | | 7.0 | | | |
| 1-(2-Hydroxyethyl)-2-pyrrolidone | | | | | | | | | | | | | | | | 15.0 | |
| Acetylenol E60 | 0.8 | 0.8 | 0.8 | 0.8 | 0.8 | 0.8 | 0.8 | 0.8 | 0.8 | 0.8 | 0.8 | 1.0 | 2.5 | 0.8 | 0.8 | 0.8 | 0.8 |
| Ammonium phthalate | | | | | | | | | | | | 2.0 | | | | | |
| Ion exchanged water | 31.2 | 31.2 | 31.2 | 37.2 | 36.8 | 18.2 | 18.2 | 32.2 | 42.2 | 41.2 | 44.2 | 47.0 | 14.7 | 43.7 | 61.2 | 56.2 | 45.7 |
| Content (%) of water | 59.2 | 59.2 | 59.2 | 60.3 | 60.2 | 60.2 | 60.2 | 64.8 | 64.6 | 62.2 | 63.8 | 47.0 | 54.7 | 64.7 | 68.2 | 70.2 | 65.3 |
| Content A (%) of solid polyhydric alcohol | 15.0 | 15.0 | 15.0 | 16.0 | 16.0 | 12.0 | 11.0 | 10.0 | 10.0 | 15.0 | 6.0 | 10.0 | 0.0 | 2.0 | 0.0 | 0.0 | 0.0 |
| Content E (%) of resin particle | 6.0 | 6.0 | 6.0 | 3.9 | 4.1 | 12.0 | 12.0 | 3.6 | 3.6 | 6.0 | 2.4 | 0.0 | 0.0 | 0.0 | 0.0 | 0.0 | 0.0 |
| E/A Ratio | 0.40 | 0.40 | 0.40 | 0.24 | 0.25 | 1.00 | 1.09 | 0.36 | 0.36 | 0.40 | 0.40 | 0.00 | — | 0.00 | — | — | — |
| Viscosity $\eta_1$ (mPa·s) of ink | 8.0 | 8.5 | 9.0 | 8.5 | 9.0 | 7.0 | 6.5 | 8.0 | 8.0 | 4.5 | 4.5 | 2.3 | 8.1 | 4.5 | 3.0 | 3.2 | 4.6 |

TABLE 2-continued

| Composition and properties of ink | | | | | | | | | | | | | | | | |
|---|---|---|---|---|---|---|---|---|---|---|---|---|---|---|---|---|
| Viscosity $\eta_2$ (mPa·s) of 20% evaporated ink | 15.0 | 18.5 | 20.0 | 12.5 | 13.5 | 11.5 | 10.5 | 16.0 | 16.0 | 12.0 | 8.0 | 6.0 | 11.5 | 6.0 | 4.5 | 9.1 | 11.0 |
| $\eta_2 - \eta_1$ (mPa·s) | 7.0 | 10.0 | 11.0 | 4.0 | 4.5 | 4.5 | 4.0 | 8.0 | 8.0 | 7.5 | 3.5 | 3.7 | 3.4 | 1.5 | 1.5 | 5.9 | 6.4 |

<Evaluation>

Evaluation shown below was performed using an ink jet recording apparatus having the constitution as shown in FIG. 1 and inks shown in Table 3. The conveyance route shown in FIGS. 2A to 2C was used for facedown discharge, while the conveyance route shown in FIGS. 3A to 3D was used for faceup discharge. The linear velocity was set at 10 inch/sec and the time from application of an ink to the rear end portion of a recording medium to completion of the discharge of the recording medium was set at 2 seconds.

A 19 cm×26 cm solid image was recorded continuously for 10 sheets under conditions of applying 10 ng of the ink to a 1/600×1/600 inch unit region of A-4 size recording media (plain paper, "SW-101", trade name; product of Canon). Recording was performed under conditions of 25° C. and relative humidity of 50%. In the invention, based on the evaluation criteria of each item shown below, "AA", "A", and "B" are acceptable level and "C" and "D" are unacceptable level. The evaluation conditions and evaluation results are shown in Table 3.

(Minus Curl)

Immediately after the 10 recorded matters were discharged, the state of minus curl was checked and minus curl was evaluated based on the following evaluation criteria.

AA: Any of the recorded matters had no minus curl.

A: Immediately after discharge, some recorded matters had minus curl momentarily but no minus curl remained when the recorded matter discharged subsequently was stacked thereon.

B: At least some of the recorded matters had minus curl but they did not cause sheet jam at the time of discharge.

C: At least some of the recorded matters had minus curl and they caused sheet-jam once to five times at the time of discharge, but minus curl was not so severe to form them into a cylinder shape.

D: At least some of the recorded matters had so severe minus curl that they became cylindrical and caused sheet-jam once to five times at the time of discharge.

(Smear)

Immediately after ten recorded matters were discharged, the smear on the back surface side of the ninth recorded matter was checked and smear was evaluated based on the following evaluation criteria.

AA: No smear appeared.

A: Ten or less of linear smears appeared.

B: More than ten of linear smears appeared, but no solid smear appeared.

C: Solid smear appeared.

TABLE 3

| Evaluation conditions and evaluation results | | | | | |
|---|---|---|---|---|---|
| | | | Evaluation conditions | Evaluation results | |
| | | Ink | Discharge method | Minus curl | Smear |
| Example | 1 | 1 | Facedown | AA | AA |
| | 2 | 2 | Facedown | AA | AA |
| | 3 | 3 | Facedown | AA | AA |
| | 4 | 4 | Facedown | AA | AA |
| | 5 | 5 | Facedown | AA | AA |
| | 6 | 6 | Facedown | AA | AA |
| | 7 | 7 | Facedown | AA | AA |
| | 8 | 8 | Facedown | AA | AA |
| | 9 | 9 | Facedown | A | AA |
| | 10 | 10 | Facedown | AA | AA |
| | 11 | 11 | Facedown | AA | AA |
| | 12 | 12 | Facedown | AA | AA |
| | 13 | 13 | Facedown | A | AA |
| | 14 | 14 | Facedown | A | AA |
| | 15 | 15 | Facedown | A | AA |
| | 16 | 16 | Facedown | A | AA |
| | 17 | 17 | Facedown | A | AA |
| | 18 | 18 | Facedown | AA | AA |
| | 19 | 19 | Facedown | B | AA |
| | 20 | 20 | Facedown | B | AA |
| | 21 | 21 | Facedown | AA | B |
| | 22 | 22 | Facedown | AA | B |
| | 23 | 23 | Facedown | AA | AA |
| | 24 | 24 | Facedown | AA | AA |
| | 25 | 25 | Facedown | AA | AA |
| | 26 | 26 | Facedown | AA | AA |
| | 27 | 27 | Facedown | B | AA |
| | 28 | 28 | Facedown | AA | AA |
| | 29 | 29 | Facedown | AA | AA |
| | 30 | 30 | Facedown | A | AA |
| | 31 | 31 | Facedown | AA | AA |
| | 32 | 32 | Facedown | AA | AA |
| | 33 | 33 | Facedown | AA | AA |
| | 34 | 34 | Facedown | AA | AA |
| | 35 | 35 | Facedown | AA | A |
| | 36 | 36 | Facedown | AA | A |
| | 37 | 37 | Facedown | AA | AA |
| | 38 | 38 | Facedown | AA | AA |
| | 39 | 39 | Facedown | A | AA |
| | 40 | 40 | Facedown | AA | AA |
| | 41 | 41 | Facedown | AA | AA |
| Comparative Example | 1 | 42 | Facedown | C | AA |
| | 2 | 43 | Facedown | D | AA |
| | 3 | 44 | Facedown | C | AA |
| | 4 | 45 | Facedown | C | AA |
| | 5 | 46 | Facedown | D | AA |
| | 6 | 47 | Facedown | D | AA |
| | 7 | 48 | Facedown | D | AA |
| | 8 | 49 | Facedown | D | AA |
| Reference Example | 1 | 1 | Faceup | AA | AA |
| | 2 | 42 | Faceup | AA | AA |
| | 3 | 43 | Faceup | AA | AA |
| | 4 | 44 | Faceup | AA | AA |
| | 5 | 45 | Faceup | AA | AA |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2017-200732, filed Oct. 17, 2017, and 2018-157320 filed Aug. 24, 2018, which are hereby incorporated by reference herein in their entirety.

What is claimed is:

1. An ink jet recording method comprising:
   a step of recording an image on a recording medium having a first surface and a second surface, by ejecting an aqueous ink from a recording head; and
   after the recording step, a step of discharging the recording medium while placing the first surface or the second surface on which the image has been recorded last on a gravitationally lower side,
   wherein the aqueous ink has a first viscosity $\eta_1$ (mPa·s) of 5.0 mPa·s or more and an evaporated ink, which is obtained by evaporating 20% by mass of the aqueous ink, has a second viscosity $\eta_2$ (mPa·s), with a difference $\eta_2 - \eta_1$ (mPa·s) being 4.0 mPa·s or more.

2. The ink jet recording method according to claim 1, wherein a content (% by mass) of water in the aqueous ink is 66.0% by mass or less based on a total mass of the ink.

3. The ink jet recording method according to claim 2, wherein the content (% by mass) of water in the aqueous ink is 35.0% by mass or more based on the total mass of the ink.

4. The ink jet recording method according to claim 1,
   wherein the aqueous ink comprises a polyhydric alcohol compound solid at 25° C., and
   wherein a content (% by mass) of the polyhydric alcohol compound in the aqueous ink is 10.0% by mass or more based on the total mass of the ink.

5. The ink jet recording method according to claim 4,
   wherein the aqueous ink comprises a resin particle having a unit containing an alkylene oxide group, and
   wherein a percentage (% by mass) of the unit containing the alkylene oxide group in the resin particle is 3.0% by mass or more.

6. The ink jet recording method according to claim 5, wherein the unit containing the alkylene oxide group is a unit derived from a monomer having 8 or more alkylene oxide groups.

7. The ink jet recording method according to claim 5, wherein the resin particle has a surface charge amount (μmol/g) of 500 μmol/g or less.

8. The ink jet recording method according to claim 5, wherein a mass ratio, in the aqueous ink, of a content (% by mass) of the resin particle to a content (% by mass) of the polyhydric alcohol compound is 0.25 times or more to 1.00 time or less.

9. The ink jet recording method according to claim 5, wherein the percentage (% by mass) of the unit containing the alkylene oxide group in the resin particle is 10.0% by mass or less.

10. The ink jet recording method according to claim 4, wherein the content (% by mass) of the polyhydric alcohol compound in the ink is 35.0% by mass or less based on the total mass of the ink.

11. The ink jet recording method according to claim 1, wherein the first viscosity $\eta_1$ (mPa·s) of the aqueous ink is 15.0 mPa·s or less.

12. The ink jet recording method according to claim 1, wherein the second viscosity $\eta_2$ (mPa·s) of the evaporated ink is the 9.0 mPa·s or more to 25.0 mPa·s or less.

13. The ink jet recording method according to claim 1, wherein $\eta_2 - \eta_1$ is 15.0 mPa·s or less.

14. The ink jet recording method according to claim 1, wherein the recording medium has a paper as a base material with no coating layer.

15. The ink jet recording method according to claim 1, wherein the recording head is a line head.

16. An ink jet recording apparatus to be used for recording an image on a recording medium having a first surface and a second surface, by ejecting an aqueous ink from a recording head, the apparatus comprising:
   a facedown discharge mechanism that discharges the recording medium while placing the first surface or the second surface on which the image has been recorded last on a gravitationally lower side,
   wherein the aqueous ink has a first viscosity $\eta_1$ (mPa·s) of 5.0 mPa·s or more and an evaporated ink, which is obtained by evaporating 20% by mass of the aqueous ink, has a second viscosity $\eta_2$ (mPa·s), with a difference $\eta_2 - \eta_1$ (mPa·s) being 4.0 mPa·s or more.

* * * * *